United States Patent
Woo (10) Patent No.: US 8,508,754 B2
(45) Date of Patent: Aug. 13, 2013

(54) STANDARD DATA FORMAT OF PRINTING DATA

(75) Inventor: Hong-rok Woo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1570 days.

(21) Appl. No.: 11/582,532

(22) Filed: Oct. 18, 2006

(65) Prior Publication Data

US 2007/0086039 A1    Apr. 19, 2007

(30) Foreign Application Priority Data

Oct. 18, 2005  (KR) ................................. 2005-98071

(51) Int. Cl.
  *G06F 15/00*  (2006.01)
  *G06K 1/00*   (2006.01)
(52) U.S. Cl.
  USPC ............................. 358/1.13; 358/1.1; 358/1.9
(58) Field of Classification Search
  USPC ....................................................... 358/1.15
  See application file for complete search history.

(56) References Cited

U.S. PATENT DOCUMENTS

| | | | |
|---|---|---|---|
| 6,208,436 B1 * | 3/2001 | Cunningham | 358/474 |
| 2002/0186393 A1 | 12/2002 | Pochuev et al. | |
| 2003/0142335 A1 | 7/2003 | Oleinik et al. | |
| 2003/0234948 A1 * | 12/2003 | Sasaki | 358/1.13 |
| 2004/0190066 A1 * | 9/2004 | Holzwarth et al. | 358/1.18 |
| 2005/0030580 A1 * | 2/2005 | Moroi | 358/1.15 |

FOREIGN PATENT DOCUMENTS

| | | |
|---|---|---|
| JP | 05-318839 | 12/1993 |
| JP | 2001-228996 | 8/2001 |
| KR | 10-0204184 | 6/1995 |

OTHER PUBLICATIONS

Office Action issued on Nov. 24, 2006 by the Korean Intellectual Property Office for Korean Patent Application No. 2005-98071.
Korean Notice of Allowance mailed Jul. 27, 2007 in corresponding Korean Patent Application 10-2005-0098071.

* cited by examiner

*Primary Examiner* — Thierry Pham
(74) *Attorney, Agent, or Firm* — Staas & Halsey LLP (57) ABSTRACT

A standard data format of printing data is provided. The data format of printing data stored or transmitted to an image forming apparatus printing the printing data includes: page data information containing pure data of the printing data; and page header information, which is information on the pure data and information for determining a figure to be printed of the printing data, wherein the data format is always maintained throughout all components in the image forming apparatus.

17 Claims, 5 Drawing Sheets

| 1 B arg | argument (1 byte) | parameter (4 bytes) |
|---|---|---|
| TPJLString | UEL+Personality | /0x1b%-12345X@PJL ENTER LANGUAGE = EMBEDDEDJOB/0x0d/0x0a (44 bytes) |
| 0x00 | NotUsed | Don't define this arument, skip argument in the parser |
| 0x01 | enSender | 0: emulation, 1: stream data from host, 2: stored job |
| 0x02 | enInterpreterID | enINT_DEFAULT = 0, enINT_PCL5E = 1, enINT_PCL4 = 2, enINT_WPS3 = 3, enINT_WPS6 = 4, enINT_KS = 5, enINT_KSSM = 6, enINT_KS5895 = 7, enINT_HWP = 8, enINT_PCLXL = 9, enINT_PS = 10, enINT_HEXDUMP = 11, enINT_EPSON = 12, enINT_PSSW = 13, enINT_PSIII = 14, enINT_COLOR = 15, enINT_QPDL = 16, enINT_IBM = 17, enINT_MYEMUL = 18, INTRPTR_TOTAL |
| 0x03 | enCopies | copies |
| 0x04 | enDuplexBinding | 0: Simplex, 1: ShortEdge, 2: LongEdge |
| 0x05 | enDuplexSide | 0: Front, 1: Back |
| 0x06 | enTonerSave | 0 : Toner Save Off, 1 : Toner Save On |
| 0x07 | enSRT | 0:ENHANCE, LIGHT, MEDIUM, DARK, ON 1:NORMAL, RET OFF, 2:GRAY+, 3: GRAY, 4 : 300dpi RET ON, 5 : 300dpi RET OFF |
| 0x08 | enResolutionType | 0 : Standard (203x98), 1 : Fine (203x96), 2 : SuperFine (203x392), 3 : SuperFine300 (300x300), 4 : Print300 (300x300), 5 : Print600 (600x600), 6 : Print1200 (1200x1200) 7: 1200x2400, 8: 1200x4800, 9: 1200x9600 |
| 0x09 | enBitPerPixel | 0: 1 x 1, 1: 2 x 1, 2: 1 x 2, 3: 4 x 2, 4: 4 x 4 ( Horizontal X Vrtical) |
| 0x10 | enWhiteLevel | 0 : White value is 0, 1 : White value 1 |
| 0x11 | enPaperSize | 0 : Letter, 1 : Legal, 2 : A4, 3 : Exec, 4 : B5, 5 : ISO-B5, 6 : Com-10, 7 : Monarch, 8 : DL, 9 : C5, 10 : Postcard, 11 : C6, 12 : Folio, 13 : A5, 14 : Statement, 15 : A6, 16 : Ledger, 17 : A3, 18 : JIS-B4, 19~20 : Reserved, 21 : Custom, 22 : LetterR, 23 : A4R, 24 : JIS-B5R, 25 : A5R, 26 : ExecR, 27 : StateR, 28 : A3Over, 29 : B5Env, 30 : Oficio |
| 0x12 | enPaperSource | 0 : Current, 1 : 1st Cassette, 2 : MPTray, 3 : MPTrayEnv, 4 : 2nd Cassette, 5 : Opt Cass, 6 : Rev Cass, 7 : Auto |
| 0x13 | enPaperType | 0 : Plain, 1 : Thick, 2 : Thin, 3 : Bond, 4 : Colored, 5 : Cardstock, 6 : Label, 7 : Transparency, 8 : Envelope, 9 : Preprinted, 10 : LetterHead, 11 : End of Type |
| 0x14 | enPaperDestination | 0 : FaceDown, 1 : FaceUp |
| 0x15 | enCustomWidth | Custom Paper Size Width, (300DPI base dots) |
| 0x16 | enCustomHeight | Custom Paper Size Height, (300DPI base dots) |
| 0x17 | enBandWidth | Kernel use Band Wdith(bits) |
| 0x18 | enBandHeight | Kernel use Band Height(bits) |
| 0x19 | enMaxBandNumber | Last Band Number (can be fixed Max band number of the paper size when enSender=1 or 2) |
| 0x20 | enColor | 0: Mono, 1: Color |
| 0x21 | enPageDataType | 0: Banded bitmap only (already renderdered, no need to release) 1: Banded bitmap + Dtisplaylist 2: Displaylist only (need to release memory : (displaylist addr table, displaylist data, raster source, scanline source, font source) |
| 0x22 | enDisplaylistAddrTableAddr_Black | The pointer of Displaylist address table memory for black |
| 0x23 | enDisplaylistAddrTableAddr_Cyan | The point of Displaylist address table memory for cyan (should be 0 when enColor=0) |
| 0x24 | enDisplaylistAddrTableAddr_Magenta | The point of Displaylist address table memory for magenta (should be 0 when enColor=0) |
| 0x25 | enDisplaylistAddrTableAddr_Yellow | The point of Displaylist address table memory for cyan yellow (should be 0 when enColor=0) |
| 0x26 | enDisplaylistDataAddr | Displaylist data linked list end pointer |
| 0x27 | enRasterGraphicSourceAddr | Raster source linked list end pointer |
| 0x28 | enScanlineSourceAddr | Scanline source linked list end pointer |
| 0x29 | enFontSourceAddr | Font cache linked list end pointer |
| 0x31 | enDispalylsitSourceInBandRlsFuncAddr | The pointer of the funtion to release Displaylist source in a band |
| 0x32 | enDispalylsitSourceInPageRlsFuncAddr | The pointer of the funtion to release Displaylist source in a page |
| 0x33-0xcc | Reserved | Can add arguments in this area |
| 0xcd | NotUsed | Don't define this arument, skip argument in the parser |
| 0xce-0xfc | Reserved | Can add arguments in this area |
| 0xfd | enPageHeaderEnd | Exit from page header parser |
| 0xfe | enEndOfJob | Exit from page information parser |
| 0xff | NotUsed | Don't define this arument, skip argument in the parser |

FIG. 4

| | argument (n byte) | description |
|---|---|---|
| Band Header (12 bytes) | uwBandNumber (2bytes) | Band number |
| | ubBandColor (1 bytes) | Band image size (bytes) |
| | ubBandType (1 bytes) | |
| | ulBandImageSize (4 bytes) | Band image size (bytes) |
| | ulBandAddress (4 bytes) | Band data address(0xffffffff when enSender=1 or 2) |
| Band Data | (ulBandImageSize bytes) | Only When enSender = 1 or 2 (from driver, or restored job) |
| Band Header | uwBandNumber | |
| | ubBandColor | |
| | ubBandType | |
| | ulBandImageSize | |
| | ulBandAddress | |
| Band Data | (ulBandImageSize bytes) | Only When enSender = 1 or 2 (from driver, or restored job) |
| | uwBandNumber | The uwBandNumber of the last band header should be enMaxBandNumber when enSender=0 |
| Band Header n | ubBandColor | |
| | ubBandType | |
| | ulBandImageSize | |
| | ulBandAddress | |
| Band Data n | (ulBandImageSize bytes) | Only When enSender = 1 or 2 (from driver, or restored job) |
| 0xffff | ubBandDataEnd | When the 2 bytes are 0xffff instead of uwBandNumber, quit the band data reading |

420 — Band Header (12 bytes)
410 — Band Data
400

FIG. 5

| kind | arg | parameter(4bytes) | arg | parameter(4bytes) | arg | parameter(4bytes) | arg | parameter(4bytes) |
|---|---|---|---|---|---|---|---|---|
| data | 00 | 00 00 00 00 | 01 | 00 00 00 01 | 02 | 00 00 00 01 | 15 | 00 00 13 60 |
| description | | enSender = emulation | | enInterpreterID=PCL5e(1) | | enCopies=1 | | enBandWidth=0x1360 |

| arg | parameter(4bytes) | arg | parameter(4bytes) | arg | parameter(4bytes) | arg | parameter(4bytes) | | arg |
|---|---|---|---|---|---|---|---|---|---|
| 16 | 00 00 00 80 | 17 | 00 00 00 34 | 18 | 00 00 00 0 | 19 | 00 00 00 0 | | fd |
| enBandHeight=80 | | enMaxBandNumber=52 | | enColor=mono (0) | | enPageDataType=banded bitmap | | | PageEnd |

FIG. 6

| kind | uwBan... | ubBandColor | ubBandTyoe | ulBandImageSize | ulBandAddress | uwBan... |
|---|---|---|---|---|---|---|
| data | 00 00 | 00 | 01 | 00 00 06 40 | 01 23 45 00 | 00 01 |
| description | band number | band color=black | band type =HCT | band data size = 0x640 | band0 address = 0x1234500 | band number |

| ubBandColor | ubBandType | ulBandImageSize | ulBandAddress | ubBandDataEnd |
|---|---|---|---|---|
| 00 | 01 | 00 00 08 80 | 01 23 4d 80 | ff ff |
| band color=black | band type =HCT | band data size = 0x880 | band0 address = 0x1234d80 | page data end |

| kind | uwBan... | ubBandColor | ubBandType | ulBandImageSize | ulBandAddress | Band Data | uwBandNumber |
|---|---|---|---|---|---|---|---|
| data | 00 00 | 00 | 01 | 00 00 00 04 | ff ff ff ff | fe ff ff | 00 01 |
| description | band number | band color=black | band type =HCT | band data size = 4 | band0 data follow | band0 data = feffff2 | band number =1 |

| ubBandColor | ubBandType | ulBandImageSize | ulBandAddress | Band Data | ubBandDataEnd |
|---|---|---|---|---|---|
| 00 | 11 | 00 00 00 02 | ff ff ff ff | fe aa | ff ff |
| band color=black | band type =FBBC | band data size = 2 | band1 data follow | band1 data = feaa | page data end |

STANDARD DATA FORMAT OF PRINTING DATA

CROSS-REFERENCE TO RELATED APPLICATIONS

This application claims all benefits accruing under 35 U.S.C. §119 from Korean Application No. 2005-98071, filed Oct. 18, 2005, in the Korean Intellectual Property Office, the disclosure of which is incorporated herein by reference.

BACKGROUND OF THE INVENTION

1. Field of the Invention

The present invention relates to data format standardization, and more particularly, to data format standardization by which a data format of printing data for an image forming apparatus is standardized by setting a data format including page header information and page data information as a fixed data format in an image forming apparatus.

2. Related Art

Figure 1:
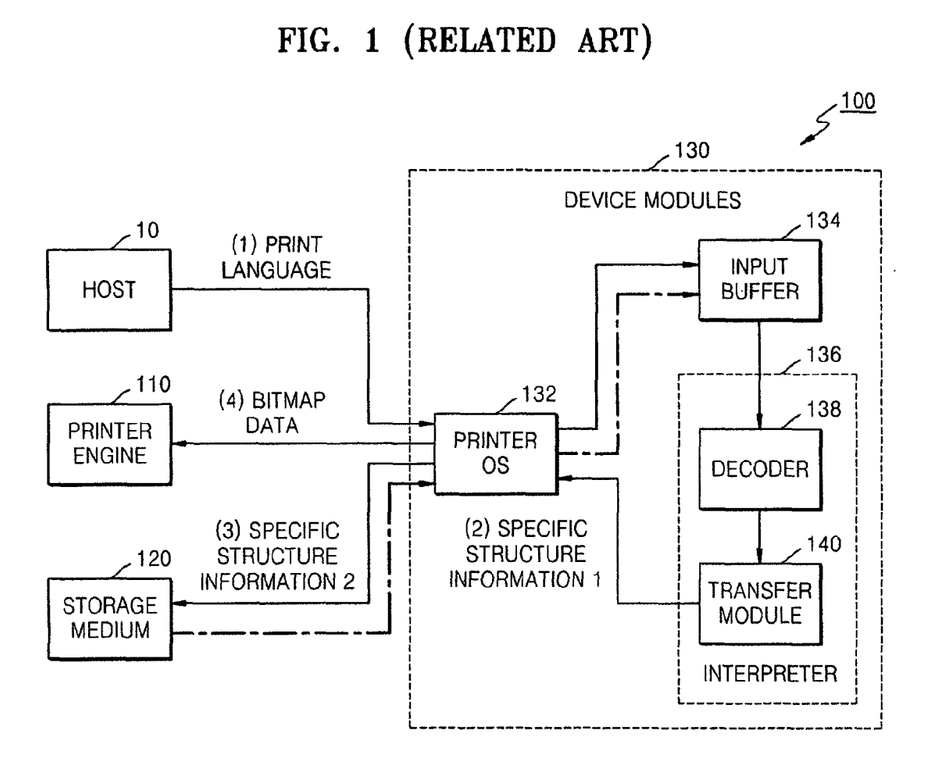
FIG. 1 is a block diagram of a typical image forming apparatus.

Generally, an image forming apparatus such as a printer, a photocopier, a facsimile machine and a multi-functional product, is designed to print an image on a printable medium, such as a paper sheet on the basis of image information. FIG. 1 is a block diagram of a typical image forming apparatus 100. As shown in FIG. 1, the image forming apparatus 100 is provided with a printer engine 110, a storage medium 120, and one or more device modules 130 including a printer operating system (OS) 132, a buffer 134 and an interpreter 136 having a decoder 138 and a transfer module 140. A process of printing data in the typical image forming apparatus 100, as shown in FIG. 1, is described below.

Printing data generated by a host 10 is transmitted to a printer operating system (OS) 132 through a printer driver (not shown). The printer OS 132 transfers the transmitted printing data to an interpreter 136, and the interpreter 136 analyzes and decodes, via a decoder 138, the transferred printing data. A printer engine 110 prints the decoded printing data transferred, via the transfer module 140, on a printable medium, such as a paper sheet.

The printer OS 132 may receive printing data generated by the host 10 or stored in a storage medium 120, such as a hard disk drive (HDD) or a flash memory.

The printer OS 132 may transfers printing data transmitted from the host 10 to the storage medium 120, and the storage medium 120 may store the transferred printing data. All of the printer OS 132, the interpreter 136, the storage medium 120, and the printer engine 110 may be included in an image forming apparatus 100, as shown in FIG. 1.

However, a data format of printing data described by the printer driver (not shown), a data format of the printing data decoded by the interpreter 136, and a data format of the printing data stored in the storage medium 120 are different from each other. That is, to print data transmitted to the printer OS 132, a data format of printing data must be converted several times. In particular, a data format of printing data transmitted to the printer OS 132 must be converted by the interpreter 136, and a data format of printing data decoded by the interpreter 136 must be converted by the printer engine 110. When the printing data transmitted to the printer OS 132 is stored, the data format of the printing data must also be converted for storage.

Since the printer OS 132, the interpreter 136, and the printer engine 110, as shown, for example, in FIG. 1, vary according to a model and/or a maker of an image forming apparatus, the converted data formats vary even according to a model and/or a maker of an image forming apparatus.

Thus, when data is transmitted from a printer driver (not shown) of a host 10 to a printer OS 132, an interpreter 136, and a printer engine 210, and is printed using an image forming apparatus of a different model, the conventional image forming apparatus has an inconvenience in that a data format corresponding to the different model must be known in advance. Due to this inconvenience, it is difficult to share printing data generated by image forming apparatuses of different models and different makers.

SUMMARY OF THE INVENTION

Several aspects and example embodiments of the present invention provide an image forming apparatus and an image forming method for printing or storing printing data of a data format standardized by setting a data format including page header information and page data information as a fixed data format which the printing data can have.

Additional aspects and/or advantages of the invention will be set forth in part in the description which follows and, in part, will be obvious from the description, or may be learned by practice of the invention.

In accordance with an embodiment of the present invention, there is provided an image forming method for printing or storing printing data, in which a data format comprising page data information which contains bitmap data of the printing data, and page header information used to transmit the printing data to a printer operating system (OS) is a standard data format of the printing data, wherein a data format of the printing data described by a printer driver, a data format of the printing data decoded by an interpreter, and a data format of the printing data stored in a storage medium are maintained all the same.

According to an aspect of the present invention, the page header information comprises an item variable, which is printing setting information prepared for each of more than one printing setting item set in advance. The page header information further comprises a state variable indicating the contents of a work, which the image forming apparatus is set for the printing data.

According to an aspect of the present invention, the page data information comprises the bitmap data; and a band data header, which is information on a location of the bitmap data on a single page.

According to another aspect of the present invention, the item variable can be set so that expansion is possible even if a description language of the printer driver is changed.

In accordance with another embodiment of the present invention, there is provided a data format of printing data stored or transmitted to an image forming device printing the printing data. Such a data format comprises: page data information containing bitmap data of the printing data; and page header information used to transmit the printing data to a printer operating system (OS), wherein a data format of the printing data described by a printer driver, a data format of the printing data decoded by an interpreter, and a data format of the printing data stored in a storage medium are all the same.

In accordance with yet another embodiment of the present invention, there is provided an image forming apparatus for printing or storing printing data, comprising: a printer operating system (OS) arranged to receive printing data from a host, via a printer driver; an interpreter arranged to analyze and decode the printing data received, via the printer OS; a printer engine arranged to print decoded printing data, via the printer OS; and a storage medium arranged to store the printing data, via the printer OS; wherein the printing data is in a fixed data format standardized by setting a data format including page data information which contains bitmap data of the printing data, and page header information used to transmit the printing data to the printer OS, and wherein the fixed data format of the printing data is maintained the same as the printing data is transmitted from a printer driver to the printer OS, from the printer OS to the interpreter, from the interpreter back to the printer OS, from the printer OS to the printer engine and/or the storage medium.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 3 illustrates page header information included in a standard data format, according to an embodiment of the present invention;

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
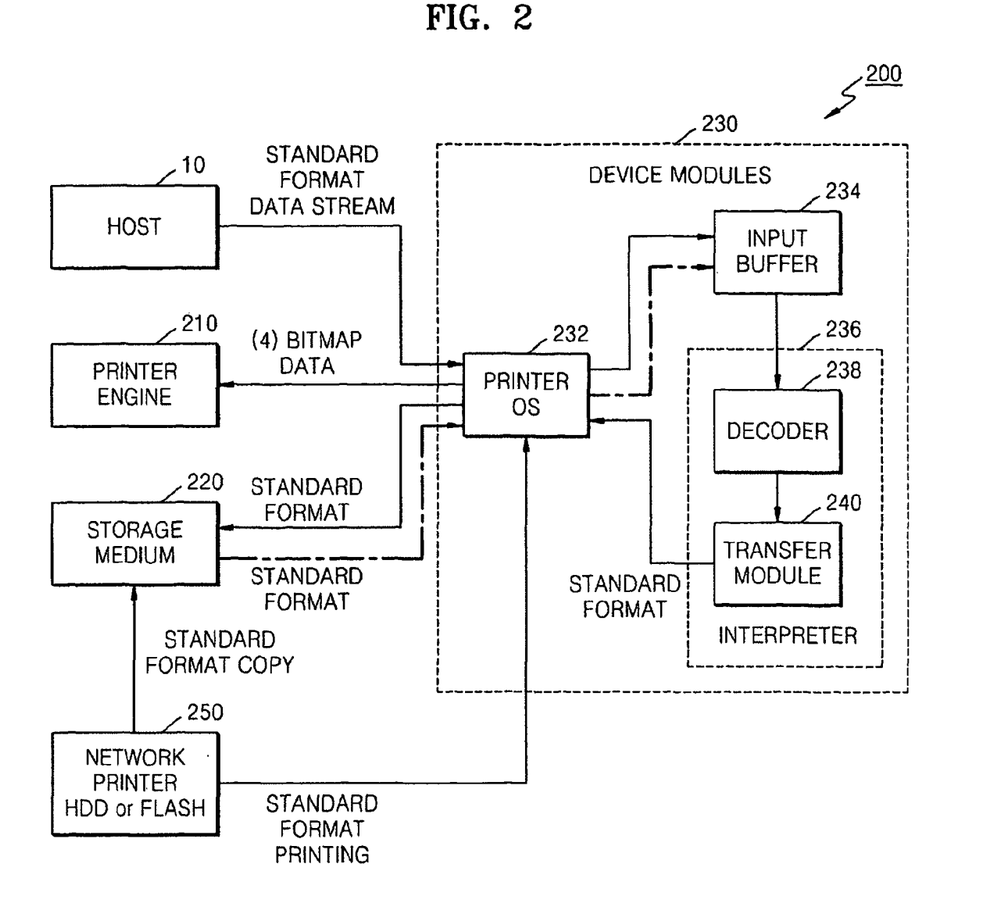
FIG. 2 is a block diagram of an image forming apparatus for printing or storing printing data of a standard data format according to an embodiment of the present invention.

FIG. 2 is a block diagram of an image forming apparatus for printing or storing printing data of a standard data format according to an embodiment of the present invention. Such an image forming apparatus can be a printer, a photocopier, a facsimile machine or a multi-functional product (MFP) having a printing function arranged to receive data from a host 10. The host 10 may be a personal computer (PC), such as a desktop or laptop computer or any other electronic device.

As shown in FIG. 2, the image forming apparatus 200 comprises a printer engine 210, a storage medium 220, one or more device modules 230 including a printer operating system (OS) 232, a buffer 234 and an interpreter 236 having a decoder 238 and a transfer module 240, and a network printer HDD (Hard Disk Drive) or FLASH 250. Herein, the network printer HDD or FLASH 250 indicates a storage medium such as HDD or flash memory, installed in an image forming apparatus 200.

A process of printing or storing printing data in an image forming apparatus 200 has been described in connection with FIG. 1. That is, printing data generated by the host 10 is transmitted to the printer OS 232 through a printer driver (not shown), and the printer OS 232 transfers the transmitted printing data to the interpreter 236. The interpreter 236 analyzes and decodes, via a decoder 236, the transferred printing data. The printer engine 210 then prints the decoded printing data transferred, via the transfer module 240, on a printable medium, such as a paper sheet.

The printer OS 232 may receive printing data generated by the host 10 or stored in the storage medium 220, such as a hard disk drive (HDD) or a flash memory. The printer OS 232 may transfers the printing data transmitted from the host 10 to the storage medium 220, and the storage medium 220 may store the transferred printing data.

Conventionally, a data format of printing data described by the printer driver (not shown), a data format of the printing data decoded by the interpreter 236, and a data format of the printing data stored in the storage medium 220 are different from each other. However, in accordance with example embodiments of the present invention, such a data format of printing data is constantly maintained throughout the components, such as a printer OS 232, an interpreter 236, a printer engine 210 and a storage medium 220 in the image forming apparatus for the sake of convenience.

For example, when the host 10 transmits printing data to the printer OS 232, when the interpreter 236 transfers printing data back to the printer OS 232, when the printer OS 232 transmits printing data decoded by the interpreter 236 to the printer engine 210 in order to print the printing data, and when the printer OS 210 transmits printing data to the storage medium 220 in order to store the printing data, a common data format of printing data is suggested in accordance with example embodiments of the present invention.

This data format standardization can be implemented by using a data format including page header information and page data information as a common data format in the image forming apparatus 200, shown in FIG. 2.

The page data information contains pure data of printing data. The pure data indicates bitmap data, which is pixel data presented using binary data. More specifically, the page data information contains the bitmap data and a band data header. The bitmap data indicates the pure data of the printing data, and the band data header is matched with every bitmap data and indicates information on a location of the bitmap data on a single page.

For example, if it is assumed that single printing data obtained by dividing printing data corresponding to a single page into a plurality of groups is a minimum unit presented by the data format according to the embodiment of the present invention, the bitmap data contained in the page data information indicates pure data of the divided printing data, and the band data header indicates information indicating a location on the single page, which corresponds to the pure data of the divided printing data.

The page header information is information on the pure data of the printing data and contains printing setting information, which is information for determining a figure obtained by printing the printing data. More specifically, the page header information may contain an item variable and a state variable. The item variable indicates printing setting information prepared for each of more than one printing setting item set in advance. Each of resolution (dpi), the size of a printable medium, the number of pages to be printed on a single printable medium may be the printing setting item. The printing setting information indicates the contents of each printing setting item.

The state variable indicates information indicating the contents of a work, which the image forming apparatus 200 is performing for the printing data. For example, the state variable indicates information on whether the printing data is being transmitted from the host 10 to the printer OS 232, from the interpreter 236 back to the printer OS 232, from the printer OS 232 to the printer engine 210, or from the printer OS 232 to the storage medium 220.

The page header information may reserve a free space in the data format for expansion.

By always maintaining the data format as described above in the image forming apparatus 200, as shown in FIG. 2, the data format is standardized in the image forming apparatus 200. That is, according to the current embodiment, a data format of printing data described by the printer driver (not shown), a data format of the printing data decoded by the interpreter 236, and a data format of the printing data stored in the storage medium 220 are all the same.

FIG. 3 illustrates example page header information included in a standard data format, according to an embodiment of the present invention. Referring to FIG. 3, the page header information 300 can be constructed by serially connecting a 1-byte item variable (argument byte) 310 and a 4-byte state variable (parameter byte) 320. The item variable 310 has a value 0x00 to 0xff, and a value of each item variable stipulates the meaning of a subsequent 4-byte state variable 320.

Figure 4:
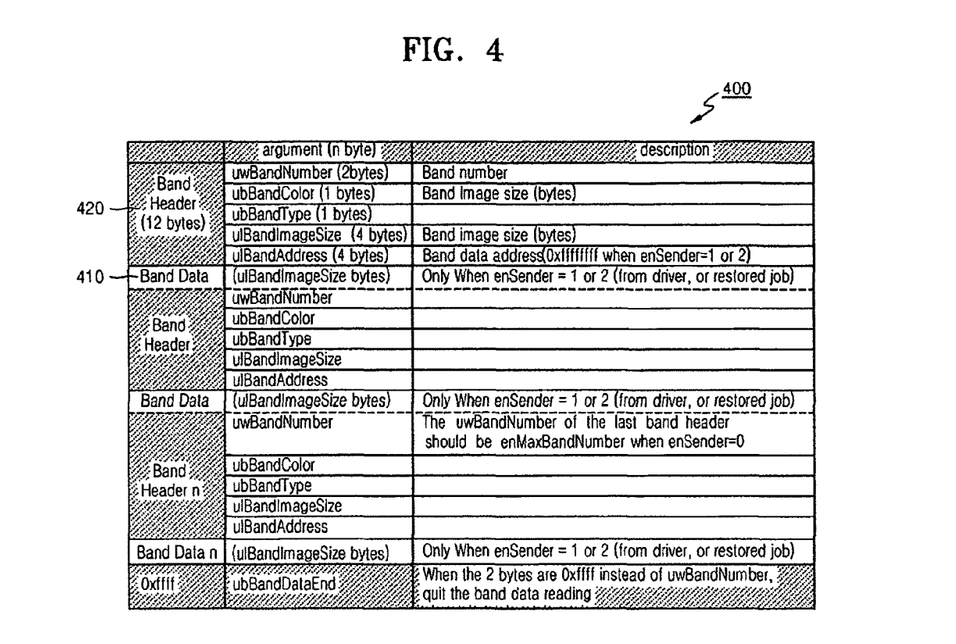
FIG. 4 illustrates page data information included in a standard data format, according to an embodiment of the present invention.

FIG. 4 illustrates example page data information included in a standard data format, according to an embodiment of the present invention. Referring to FIG. 4, the page data information 400 includes bitmap data 410, which is pure data of printing data, and a band data header 420, which is information on a location of the pure data on a single page.

Figure 5:
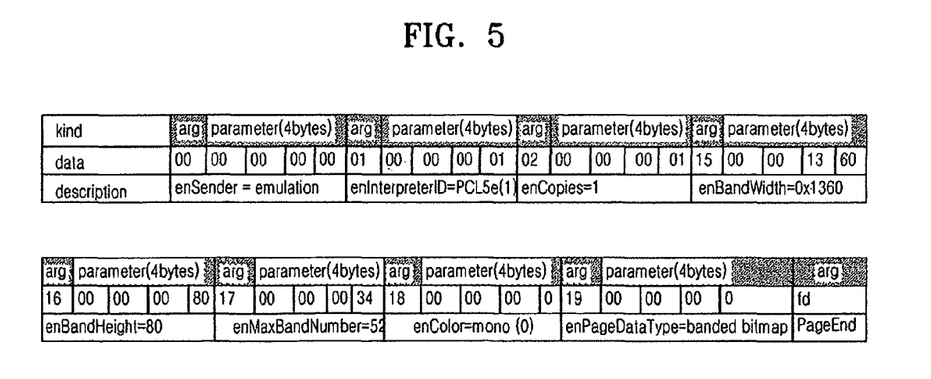
FIG. 5 illustrates page header information of single-page printing data, according to another embodiment of the present invention.

FIG. 5 illustrates example page header information of single-page printing data, according to another embodiment of the present invention. Herein, the right side of the above diagram should be connected to the left side of the below diagram. Therefore, two separated diagrams shown in FIG. 5 comprise one body.

Figure 6:
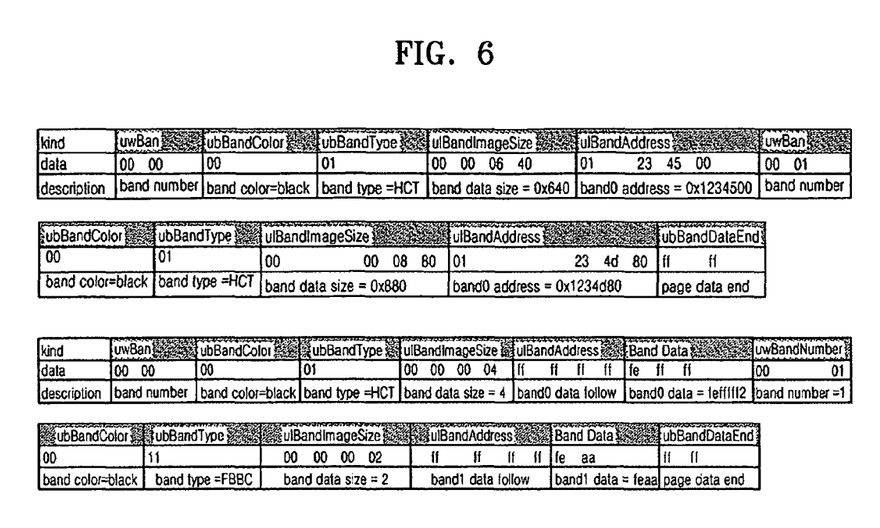
FIG. 6 illustrates page data information of single-page printing data, according to another embodiment of the present invention.

FIG. 6 illustrates example page data information of single-page printing data, according to another embodiment of the present invention. Herein, two separate diagrams located above in FIG. 6 comprise one body. Like this manner, two separate diagrams located below in FIG. 6 comprise one body.

Referring to FIG. 5 and FIG. 6, the single-page printing data is presented using the data format according to an embodiment of the present invention. The page header information is constructed by serially connecting a 1-byte item variable (argument byte) and a 4-byte state variable (parameter byte), and the page data information includes bitmap data constructed to fit the data format according to an embodiment of the present invention.

As described above, according to embodiments of the present invention, since a data format including page header information and page data information is always maintained in an image forming apparatus, a data format of printing data can be standardized. Thus, any printing data handled in the image forming apparatus has the common data format, and accordingly, like printing data generated by a printer driver (not shown) of a host 10, printing data stored in a storage medium 220, such as an HDD or a flash memory, also can be printed in the same process. Furthermore, since the printing data generated by the printer driver (not shown) of the host 10 maintains the same data format as the printing data in the storage medium 220, the generated printing data can be stored in the storage medium 220 without separate analysis. In addition, a work file stored in a certain printer can be printed in another printer by moving the work file over a network. In addition, a form overlay can be performed by merging stored printing data of the same data format and printing setting information.

While the present invention has been particularly shown and described with reference to exemplary embodiments thereof, it will be understood by those of ordinary skill in the art that various changes in form and details may be made therein without departing from the spirit and scope of the present invention. For example, components of an image forming apparatus, as shown in FIG. 2, can be arranged differently as long as the data format of printing data is standardized among all components therein. Accordingly, it is intended, therefore, that the present invention not be limited to the various example embodiments disclosed, but that the present invention includes all embodiments falling within the scope of the appended claims.

What is claimed is:

1. An image forming method for printing or storing printing data in an image forming apparatus including a printer engine, a storage medium, a printer operating system (OS) and an interpreter, the method comprising:

formatting printing data in a fixed data format including page data information which contains bitmap data of the printing data, and page header information used to transmit the printing data to the printer OS; and maintaining the fixed data format of the printing data the same as the printing data is transmitted from a printer driver to the printer OS, from the printer OS to the interpreter, from the interpreter back to the printer OS, from the printer OS to the printer engine and/or the storage medium, wherein the page header information includes a state variable indicating contents of a work, which the image forming apparatus is performing for the printing data, and indicating information on where the printing data is being transmitted inside the image forming apparatus.

2. The method as claimed in claim 1, wherein the page header information comprises an item variable, which is printing setting information prepared for each of more than one printing setting item set in advance.

3. The method as claimed in claim 1, wherein the page data information comprises:

the bitmap data; and a band data header, which is information on a location of the bitmap data on a single page.

4. The method as claimed in claim 2, wherein the item variable can be set so that expansion is possible even if a description language of the printer driver is changed.

5. A data format of printing data stored in a non-transitory computer-readable storage medium for printing the printing data using an image forming apparatus including a printer engine, a storage medium, a printer operating system (OS) and an interpreter, the data format comprising:

page data information containing bitmap data of the printing data; and page header information used to transmit the printing data to the printer OS, wherein the printing data is in a fixed data format and is maintained the same as the printing data is transmitted from a printer driver to the printer OS, from the printer OS to the interpreter, from the interpreter back to the printer OS, from the printer OS to the printer engine and/or the storage medium, and wherein the page header information includes a state variable indicating contents of a work, which the image forming apparatus is performing for the printing data, and indicating information on where the printing data is being transmitted inside the image forming apparatus.

6. The data format as claimed in claim 5, wherein the page header information comprises an item variable, which is printing setting information prepared for each of more than one printing setting item set in advance.

7. The data format as claimed in claim 5, wherein the page data information comprises:
the bitmap data; and
a band data header, which is information on a location of the bitmap data on a single page.

8. The data format as claimed in claim 6, wherein the item variable can be set so that expansion is possible even if a description language of the printer driver is changed.

9. An image forming apparatus for printing or storing printing data, comprising:
a printer operating system (OS) arranged to receive printing data from a host, via a printer driver;
an interpreter arranged to analyze and decode the printing data received, via the printer OS;
a printer engine arranged to print decoded printing data, via the printer OS; and
a storage medium arranged to store the printing data, via the printer OS;
wherein the printing data is in a fixed data format standardized by setting a data format including page data information which contains bitmap data of the printing data, and page header information used to transmit the printing data to the printer OS,
wherein the fixed data format of the printing data is maintained the same as the printing data is transmitted from a printer driver to the printer OS, from the printer OS to the interpreter, from the interpreter back to the printer OS, from the printer OS to the printer engine and/or the storage medium, and
wherein the page header information includes a state variable indicating contents of a work, which the image forming apparatus is performing for the printing data, and indicating information on where the printing data is being transmitted inside the image forming apparatus.

10. The image forming apparatus as claimed in claim 9, wherein the page header information comprises an item variable, which is printing setting information prepared for each of more than one printing setting item set in advance.

11. The image forming apparatus as claimed in claim 9, wherein the page data information comprises:
the bitmap data; and
a band data header, which is information on a location of the bitmap data on a single page.

12. The image forming apparatus as claimed in claim 10, wherein the item variable can be set so that expansion is possible even if a description language of the printer driver is changed.

13. The image forming apparatus as claimed in claim 9, wherein the page header information comprises:
an item variable indicating printing setting information prepared for each of printing set items set in advance; and
a state variable indicating information on whether the printing data is being transmitted from the host to the printer OS, from the interpreter back to the printer OS, from the printer OS to the printer engine and/or the storage medium.

14. The image forming method as claimed in claim 1, wherein the page header information comprises:
an item variable indicating printing setting information prepared for each of printing set items set in advance; and
a state variable indicating information on whether the printing data is being transmitted from the host to the printer OS, from the interpreter back to the printer OS, from the printer OS to the printer engine and/or the storage medium.

15. The data format as claimed in claim 5, wherein the page header information comprises:
an item variable indicating printing setting information prepared for each of printing set items set in advance; and
a state variable indicating information on whether the printing data is being transmitted from the host to the printer OS, from the interpreter back to the printer OS, from the printer OS to the printer engine and/or the storage medium.

16. An image forming method for printing or storing printing data in an image forming apparatus including a printer engine, a storage medium, a printer operating system (OS) and an interpreter, the method comprising:
formatting printing data in a fixed data format comprising page data information that contains bitmap data of the printing data and a band data header, and page header information used to transmit the printing data to the printer OS; and
maintaining the fixed data format of the printing data the same as the printing data is transmitted from a printer driver to the printer OS, from the printer OS to the interpreter, from the interpreter back to the printer OS, from the printer OS to the printer engine and/or the storage medium,
wherein the page header information includes a state variable indicating contents of a work, which the image forming apparatus is performing for the printing data, and indicating information on where the printing data is being transmitted inside the image forming apparatus.

17. An image forming apparatus for printing or storing printing data, the apparatus comprising:
a printer operating system (OS) arranged to receive the printing data via a printer driver;
an interpreter arranged to analyze and decode the printing data received via the printer OS;
a printer engine arranged to print decoded printing data; and
a storage medium arranged to store the printing data;
wherein the printing data is in a fixed data format standardized by setting a data format comprising page data information, which contains bitmap data of the printing data, and page header information used to transmit the printing data to the printer OS,
wherein the fixed data format of the printing data is maintained the same as the printing data is transmitted from a printer driver to the printer OS, from the printer OS to the interpreter, from the interpreter back to the printer OS, and from the printer OS to the printer engine and/or the storage medium, and
wherein the page header information includes a state variable indicating contents of a work, which the image forming apparatus is performing for the printing data, and indicating information on where the printing data is being transmitted inside the image forming apparatus.

* * * * *